United States Patent
Holder et al.

(10) Patent No.: US 7,291,222 B2
(45) Date of Patent: Nov. 6, 2007

(54) SYSTEMS AND METHODS FOR MEASURING AND REDUCING DUST IN GRANULAR MATERIAL

(75) Inventors: John D. Holder, Lake St. Louis, MO (US); Hariprasad Sreedharamurthy, Ballwin, MO (US); John D. Hilker, St. Charles, MO (US)

(73) Assignee: MEMC Electronic Materials, Inc., St. Peters, MO (US)

( * ) Notice: Subject to any disclaimer, the term of this patent is extended or adjusted under 35 U.S.C. 154(b) by 413 days.

(21) Appl. No.: 10/930,654

(22) Filed: Aug. 31, 2004

(65) Prior Publication Data

US 2005/0279277 A1    Dec. 22, 2005

Related U.S. Application Data

(60) Provisional application No. 60/581,309, filed on Jun. 18, 2004.

(51) Int. Cl.
*C30B 15/02*    (2006.01)

(52) U.S. Cl. .............................. 117/31; 117/33; 117/34; 117/213; 117/217

(58) Field of Classification Search ................. 117/31, 117/33, 213, 217, 34
See application file for complete search history.

(56) References Cited

U.S. PATENT DOCUMENTS

| | | | | |
|---|---|---|---|---|
| 3,998,686 | A | * | 12/1976 | Meiling et al. ............... 117/33 |
| 4,710,260 | A | * | 12/1987 | Witter et al. ................. 423/350 |
| 5,242,531 | A | * | 9/1993 | Klingshirn et al. ........... 117/21 |
| RE35,242 | E | * | 5/1996 | Kajimoto et al. ............. 117/31 |
| 5,588,993 | A | | 12/1996 | Holder |
| 5,855,232 | A | | 1/1999 | Oda et al. |
| 5,919,303 | A | | 7/1999 | Holder |
| 6,062,094 | A | | 5/2000 | Carlini et al. |
| 6,231,669 | B1 | * | 5/2001 | Altekruger et al. ......... 117/214 |
| 6,285,730 | B1 | | 9/2001 | Barnes |
| 6,609,870 | B2 | | 8/2003 | Williams et al. |
| 2003/0077128 | A1 | | 4/2003 | Williams et al. |

FOREIGN PATENT DOCUMENTS

| | | |
|---|---|---|
| DE | 36 43 378 A1 | 6/1988 |
| JP | 01-065010 | 3/1989 |
| JP | 06-191817 | 7/1994 |

(Continued)

OTHER PUBLICATIONS

International Search Report. PCT/US2005/016527, dated Jun. 20, 2006.
Hanby, I., Dust Monitoring Equipment web page, http://web.archive.org/web/20040221061040/http://www.btinternet.com/~ian.hanby/index.html, 2 pages, admitted prior art, no date.

(Continued)

*Primary Examiner*—Robert Kunemund
(74) *Attorney, Agent, or Firm*—Senniger Powers (57) ABSTRACT

The invention is directed to apparatus and methods for measuring and for reducing dust in granular polysilicon. In one aspect, a system includes a process vessel having a vacuum port for pulling dust from the polysilicon. Another system of the invention includes a baffle tube for receiving a polysilicon flow. A measuring system includes a manifold and filter for separating and measuring the dust from a flow of polysilicon. The invention is also directed to methods of using the systems, to methods of manufacturing and packaging granular polysilicon, and to a supply of granular polysilicon.

33 Claims, 9 Drawing Sheets

FOREIGN PATENT DOCUMENTS

| | | |
|---|---|---|
| WO | WO 01/84116 A1 | 11/2001 |
| WO | 02/094714 A1 | 11/2002 |

OTHER PUBLICATIONS

Hokori Sensors and Comprehensive Dust Monitoring Systems web page, http://web.archive.org/web/20020723021635/http://www.kosinsha.co.jp/english/dustsensor/dustsensor.html, 1 page, admitted prior art, no date.

Multisizer™ 3 Coulter Counter® web page, http://www.coulter.com/products/instrument/partChar/pc_multisizer3.asp, 4 pages, admitted prior art, no date.

Product Range web page, http://www.landinst.com/comb/products/products.html, 2 pages, admitted prior art, no date.

Perry, R.H., *Perry's Chemical Engineers' Handbook Sixth Edition*, 1984, pp. 5-63 through 5-68 and 20-78 through 20-80, McGraw-Hill, Inc., no date.

\* cited by examiner

SYSTEMS AND METHODS FOR MEASURING AND REDUCING DUST IN GRANULAR MATERIAL

CROSS-REFERENCE TO RELATED APPLICATIONS

This application is a non-provisional of U.S. Provisional Patent Application Ser. No. 60/581,309, filed Jun. 18, 2004, the entire text of which is hereby incorporated by reference.

BACKGROUND OF THE INVENTION

This invention relates to dust in granular material, and more particularly to apparatus and methods for measuring and for reducing dust in granular polysilicon used to grow semiconductor crystal and solar-grade crystal.

Granular polysilicon, such as CVD grown fluidized bed granular polysilicon, is typically delivered to a crystal growing facility in a shipping container. A conventional container has 300 kg of granular polysilicon. The granular polysilicon is typically sized between 400 and 1400 microns, and any particles sized less than 10 microns is considered dust. As a practical matter, all containers include some amount of dust therein.

The prior art has failed to recognize the extent to which dust can affect the yield of high quality semiconductor crystal. Substantial quantities of dust mixed with the granular polysilicon increases the risk of undesirable defects, such as "Loss of Zero Dislocation" (LZD) in high quality semiconductor crystal. While relatively small batches of prior art granular polysilicon have included acceptably low amounts of dust, there has been no reliable system for obtaining such low-dust polysilicon in large quantities using modern continuous manufacturing methods. Accordingly, improved methods of measuring the dust, reducing the dust and specifying maximum allowable dust in the granular polysilicon are needed.

SUMMARY OF THE INVENTION

Briefly, one aspect of the invention is a system for removing dust from granular polysilicon comprising a vacuum source for pulling dust away from the polysilicon and a process vessel adapted to receive the granular polysilicon. The process vessel includes opposite first and second ends, a polysilicon passage in the first end for allowing passage of the granular polysilicon and a vacuum port for connection to the vacuum source. The vacuum port is disposed adjacent the second end of the process vessel so that the polysilicon does not block the port when the process vessel is rotated from the upright position for pouring of the polysilicon from the process vessel. The system further comprises a container for receiving the granular polysilicon from the process vessel.

In another aspect, the invention is directed to the process vessel comprising the polysilicon passage, vacuum port and a closure.

In yet another aspect, the invention is a method of removing dust from a quantity of polysilicon material comprising granular polysilicon and dust stored in a process vessel having a polysilicon passage and a vacuum port. The method comprises pouring the quantity of polysilicon material from the process vessel into the container and pulling a vacuum through the vacuum port to pull the dust from around the granular polysilicon and to inhibit pulling of the granular polysilicon.

In a different aspect, a system for removing dust from a flow of granular polysilicon comprises a baffle tube having an upper opening adapted for fluid communication with a granular polysilicon supply for receiving the flow of granular polysilicon and a lower opening for discharging the granular polysilicon. At least one baffle is below the upper opening to alter the direction of flow of the granular polysilicon to encourage dust entrained in the granular polysilicon to separate from the granular polysilicon. A vacuum source is connected to the upper opening to pull gas-entrained dust opposite a direction of the flow of the granular polysilicon through the baffle tube.

In another aspect, a system for measuring dust in a flow of granular polysilicon comprises a vacuum source, a filter to capture dust for use in measuring the dust, and a manifold. The manifold includes a dust collection chamber for allowing passage of the granular polysilicon, an outlet extending from the collection chamber and in fluid communication with the vacuum source for pulling dust from the chamber and an air passage including at least one port extending from the passage to an atmosphere surrounding the system. The filter is disposed between the outlet and the vacuum source. The at least one port of the air passage is disposed adjacent the outlet for drawing ambient air through the passage opposite the direction of flow of the granular polysilicon to thereby encourage the dust to exit the passage through the outlet and thereafter be trapped in the filter.

In still another aspect, a method of measuring dust from a flow of granular polysilicon uses an apparatus comprising the vacuum source, filter and manifold. The method comprises the steps of weighing the filter a first time and operating the vacuum source for a predetermined period of time as the stream of granular polysilicon flows through the passage at a predetermined mass flow rate. The vacuum source operates to draw air and dust particles through the outlet and to the filter where the dust is captured. Operation of the vacuum source is stopped and the filter is weighed a second time after operation of the vacuum source to determine the weight of the dust particles.

In yet another aspect, a supply of granular polysilicon produced in a continuous manufacturing method has an average diameter or average width sized between 400 and 1400 microns. The supply of granular polysilicon weighs at least about 3000 kg, and particles of dust entrained in the polysilicon are sized less than 10 microns and have a mass less than 3 mg of dust per 100 kg of polysilicon.

In another aspect, a method of manufacturing granular polysilicon comprises forming the granular polysilicon by chemical vapor deposition in a fluidized bed process and classifying the granular polysilicon by size. Dust is removed from the granular polysilicon so that dust within the granular polysilicon has a mass less than 3 mg per 100 kg of polysilicon. The granular polysilicon is packaged after the dust has been removed.

Other features of the present invention will be in part apparent and in part pointed out hereinafter.

BRIEF DESCRIPTION OF THE DRAWINGS

Corresponding reference characters indicate corresponding parts throughout the drawings.

DESCRIPTION OF THE PREFERRED EMBODIMENTS

Figure 1:
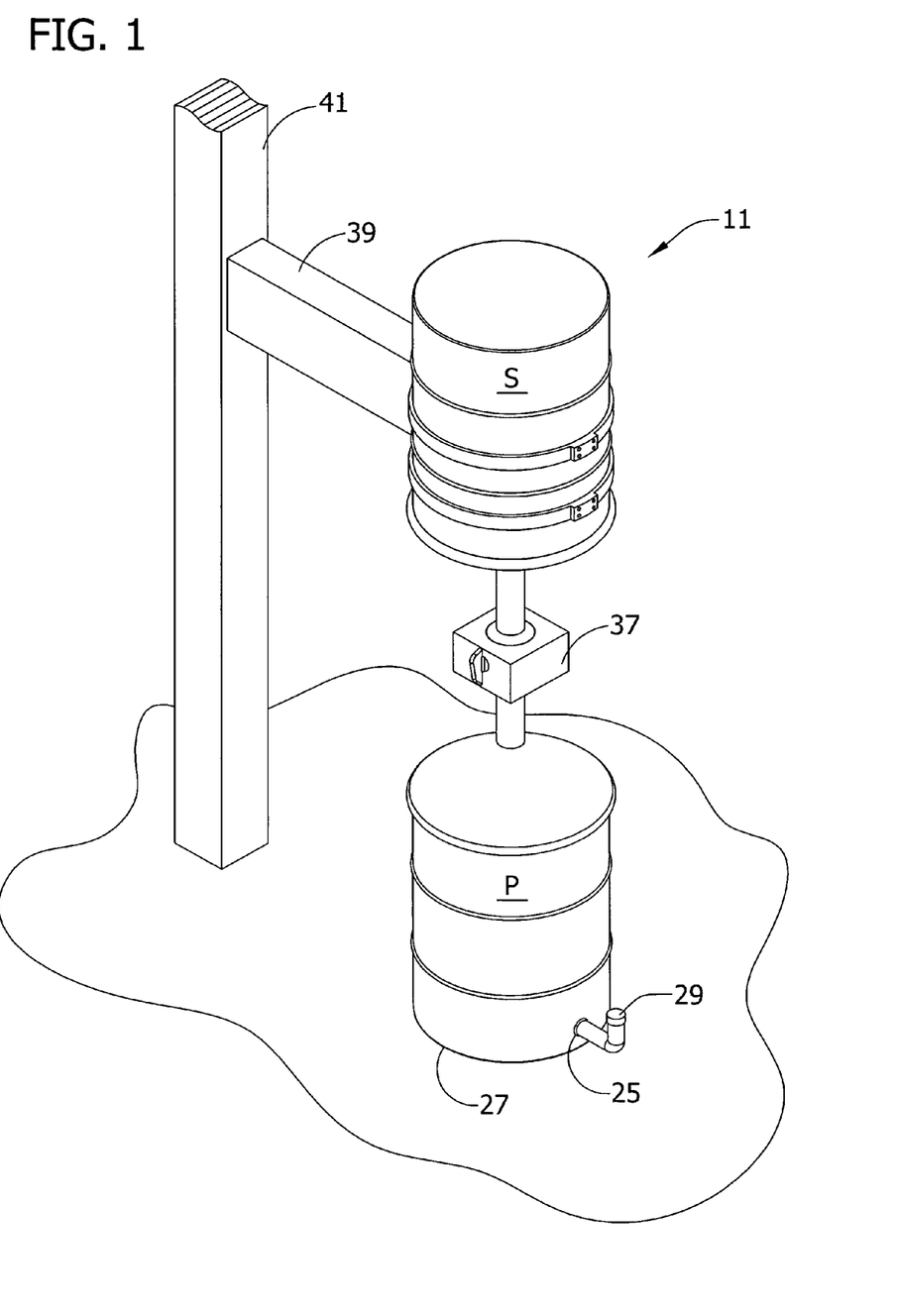
FIG. 1 is a perspective view of a process vessel, valve and source vessel, the source vessel being turned upside down for pouring granular polysilicon through the valve into the process vessel.
Figure 2:
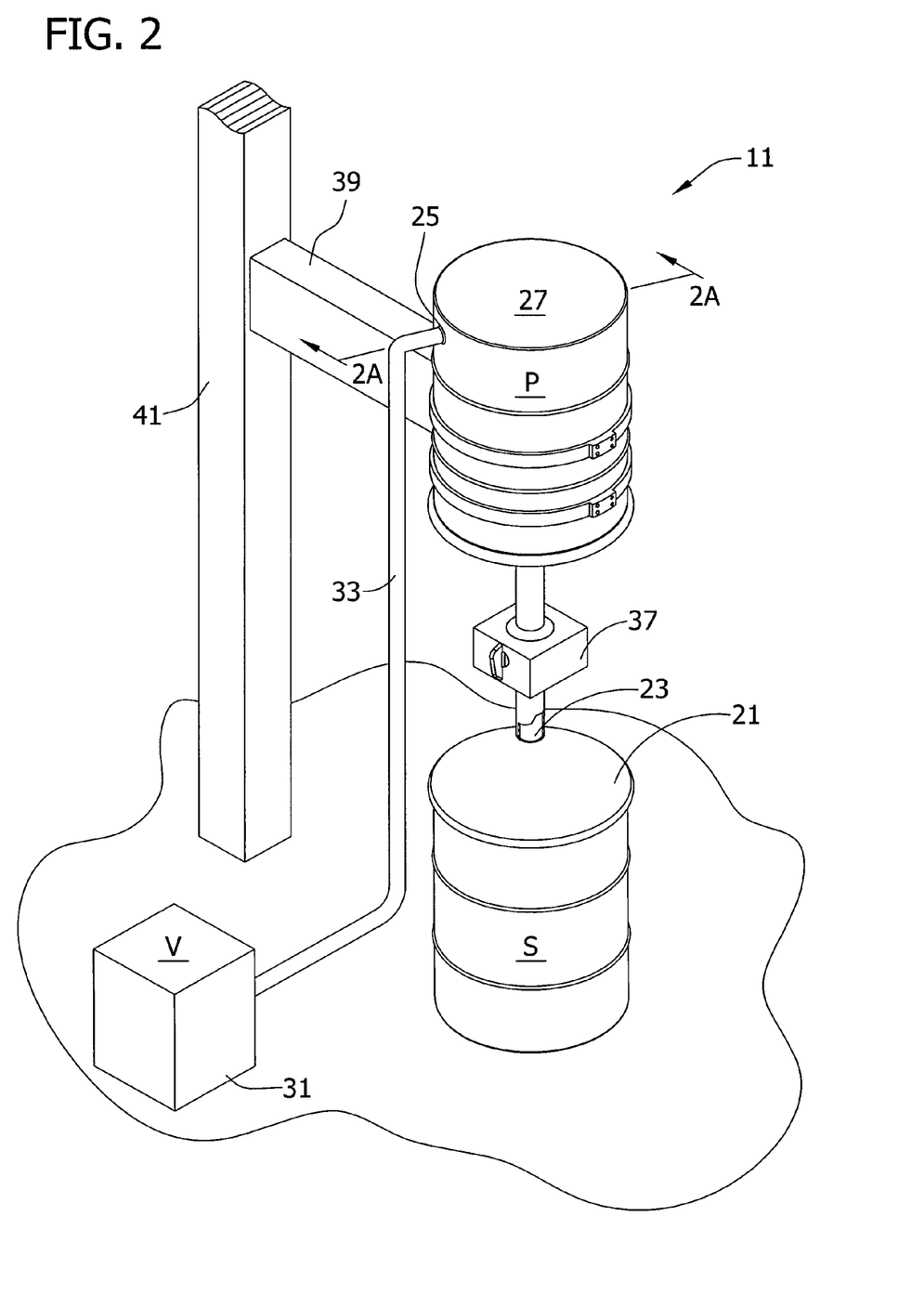
FIG. 2 is a perspective view similar to FIG. 1 but with the positions of the process and source vessels reversed and schematically showing a vacuum source for removing dust from the granular polysilicon.
Figure 2A:
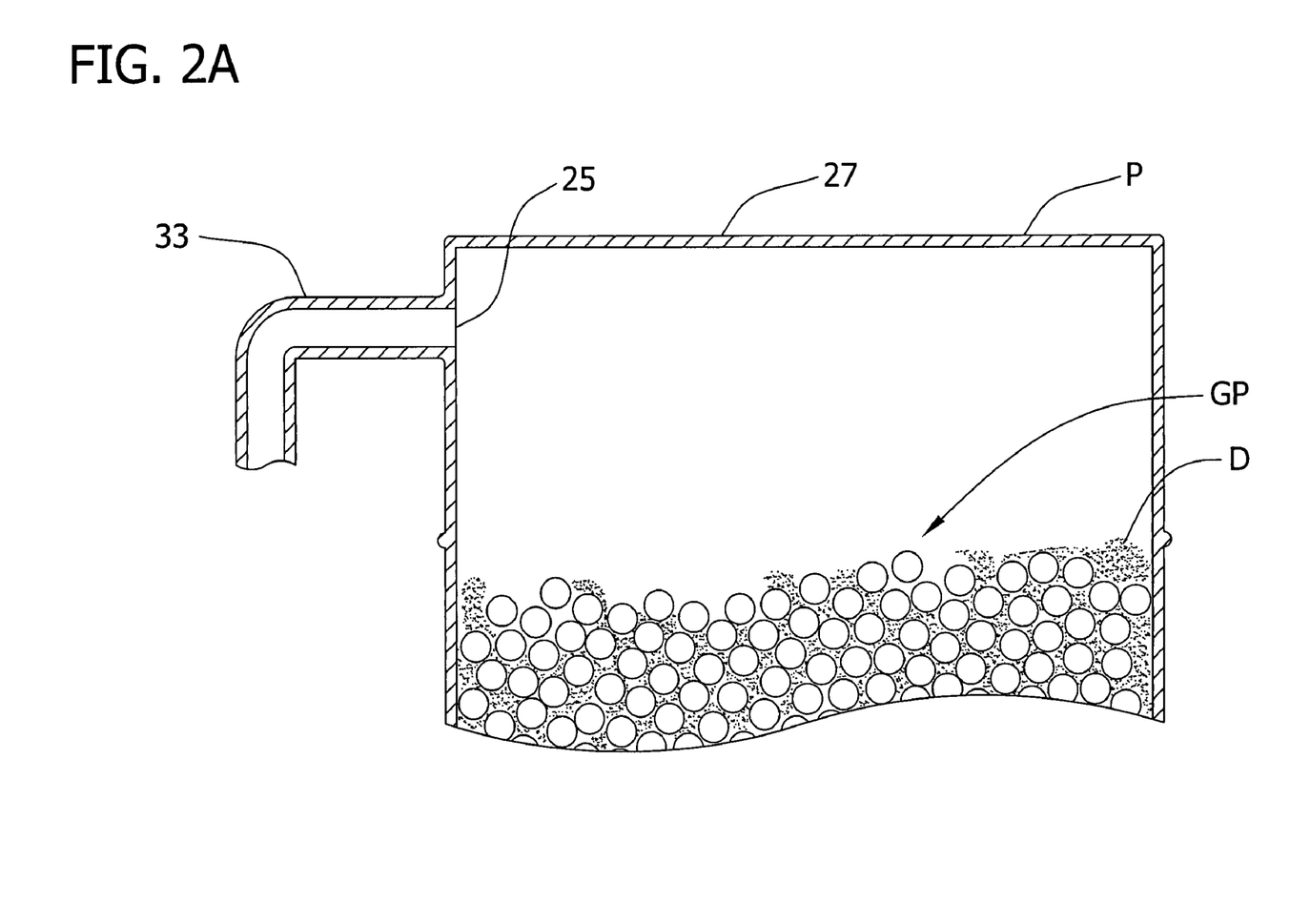
FIG. 2A is a fragmentary cross-section of the process vessel taken along line 2A--2A of FIG. 2.

Referring to FIGS. 1-2A, a system for removing dust from granular polysilicon is generally designated 11. The system 11 generally comprises a source vessel S for containing the granular polysilicon GP, dust D mixed in with the granular polysilicon, a vacuum source V for pulling dust away from the granular polysilicon, and a process vessel P. For purposes of the present description, dust D is formed by those particles of polysilicon which are so small as to easily become airborne when the polysilicon material is handled. Generally speaking, these particles have a size of 10 microns or less.

The source vessel S contains a bulk supply of granular polysilicon GP (broadly, granular material). Typically, the source vessel S is cylindric and includes a conical upper end 21 with a central opening 23 (broadly, polysilicon passage).

The process vessel P is substantially identical to the source vessel S, except that the process vessel is modified to include a vacuum port 25 adjacent a second end 27 of the vessel in the side of vessel (the lower end when the vessel is upright). In this embodiment, the port 25 is disposed above the level of granular polysilicon when the vessel P is inverted so that granular polysilicon does not block the port (FIG. 2A). The vacuum port 25 may be fitted with a closure 29 to retain the granular polysilicon therein when the vessel is upright as shown in FIG. 1. The vacuum port 25 may also include a conventional quick-connector for enabling quick connection of a hose. Note that the port 25 may be disposed in other parts of the vessel, e.g., in the upper end. It is also contemplated for the port to extend from a second opening in the upper (first) end, e.g., and include a tube extending from this opening through the granular polysilicon to adjacent the lower (second) end.

The vacuum source V includes a pump 31 for drawing the vacuum and a vacuum hose 33 connecting the pump to the vessel P. The vacuum source V may also include a filter (not shown) to inhibit the dust D from entering the pump or entering the atmosphere around the system 11.

In one method of removing dust D from the polysilicon material in the source vessel S, a valve 37, such as an "angle of repose" (AOR) valve, is attached to the opening 23 of the source vessel. The source vessel S is inverted (FIG. 1) and secured by an arm 39 extending from vertical post 41, the valve 37 is connected to the process vessel P, and the valve is opened to allow granular polysilicon GP and dust D to flow from the source vessel to the process vessel. After the source vessel S is emptied, both vessels are inverted, again with the valve 37 mounted between the vessels, so that they are in the configuration shown in FIG. 2. The configuration of FIG. 2 is similar to that of FIG. 1, except that the vacuum hose 33 is connected to the vacuum port 25. The valve 37 is opened, and as the granular polysilicon GP and dust D flows back toward the source vessel S, the vacuum pulls airborne dust D from around the granular polysilicon. Note that the vacuum creates a counterflow of gas at or adjacent the opening 23 of the process vessel P, the counterflow functioning to pull airborne dust D from around the granular polysilicon GP generally at or adjacent the opening. The airborne dust is pulled out of the process vessel P thereby preventing the dust from re-entering the source vessel S.

In one embodiment, the vacuum source is set to apply a vacuum pressure so that the granular polysilicon GP flows from the process vessel P at a rate of about 10 kg/min. The exact vacuum pressure necessary to allow such flow will vary with factors such as the size of the opening 23 and the size of the process vessel P. A suitable method of finding the appropriate vacuum pressure is to begin the process at a pressure that does not allow the granular polysilicon GP to flow from the process vessel P and then reduce the vacuum pressure until the granular polysilicon flows at a satisfactory rate that allows for both efficient processing and significant reduction of dust D in the polysilicon material. The vacuum pressure may vary for different systems, for example, between about 1.3 and 5.1 cm of water below atmospheric pressure. However, once an appropriate pressure is determined for a particular system, the pressure need not be varied.

Figure 3:
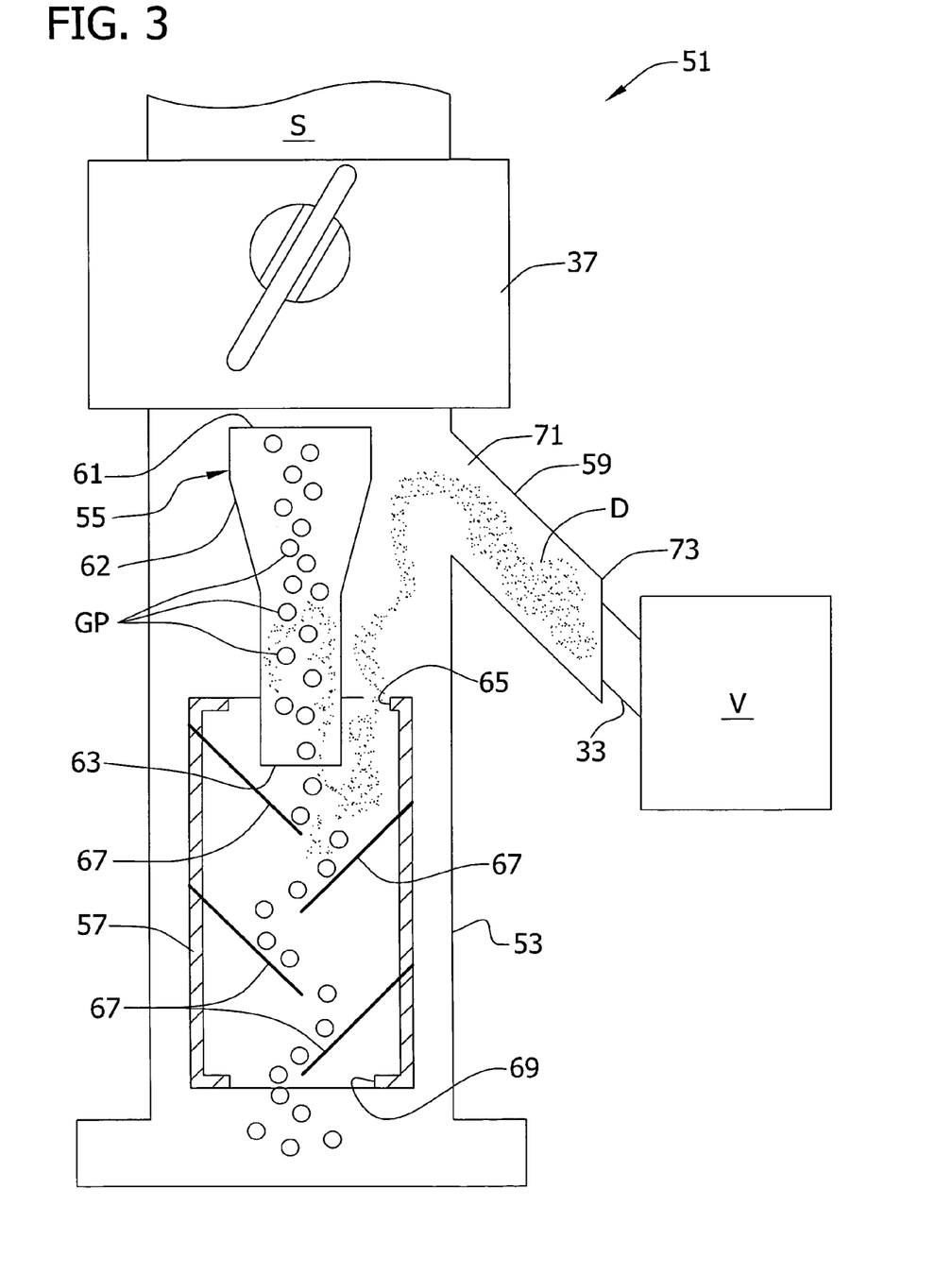
FIG. 3 is a partially schematic cross-section showing another system for removing dust from the granular polysilicon.

Referring to FIG. 3, another system 51 for removing dust D from the granular polysilicon GP comprises a housing 53 mounting a funnel 55, a baffle tube 57, and a vacuum port 59. The housing 53 is mounted on a lower portion of the valve 37, the valve being connected to the source vessel S in a configuration like that shown in FIG. 1. The funnel 55 is mounted in an upper section of the housing 53. The funnel 55 has a wide entrance 61 for receiving the granular polysilicon and a conical section 62 that narrows toward a lower section 63. The baffle tube 57 includes an upper opening 65 receiving the exit of the funnel 55, baffles 67 disposed just below the exit, and a lower opening 69 for discharging the granular polysilicon GP to another container (not shown). The baffles 67 extend at a downward angle from the inner wall of the tube and extend about halfway across the baffle tube 57. The baffles 67 are thereby shaped and arranged to repeatedly alter the flow of the granular polysilicon GP through the tube 57 to thereby encourage dust D entrained in the granular polysilicon or attached to the granules to separate from the granular polysilicon and become airborne. The airborne dust can be pulled upwardly out of the baffle tube 57 by vacuum. Four baffles 67 are shown, though any number of baffles may be used within the scope of this invention. Other types of baffles are contemplated within the scope of this invention.

The vacuum port 59 has a first end 71 joined to the upper section of the housing 53 and extends at a downward angle to a second end 73 that receives the hose 33 from the vacuum source V. The first end 71 of the vacuum port 59 is disposed adjacent the funnel 55 and above the upper opening 65 of the baffle tube 57 so that the vacuum port is spaced from the upper opening and the funnel is interposed between the vacuum port and the stream of granular polysilicon. In this way, the granular polysilicon flow is shielded from the vacuum to thereby inhibit the granules from being pulled into the vacuum. The vacuum creates a counterflow of air opposite the direction of polysilicon flow so that only the airborne dust D is pulled by the vacuum. Note that each of the vacuum port 59, the funnel 55 and the baffle tube 57 may be attached to the housing 53 in any suitable manner, such as by welding or by forming integrally in the housing as a one-piece system. Also, the main function of the funnel 55 is to shield the granular polysilicon GP from the vacuum, and it is contemplated that the funnel be replaced by a tube or channel, rather than a conical funnel.

In a method of using the system 51, the vacuum source V is activated. The valve 37 is opened so that granular polysilicon GP flows through the funnel 55 and the baffle tube 57. The vacuum source V operates to pull a substantial portion of the dust D from around the granular polysilicon GP. The method is satisfactory to reduce the dust D in most granular polysilicon. More specifically, this arrangement pulls a sufficient amount of the airborne dust from the polysilicon flow so that the discharged granular polysilicon GP is within the dust specification, e.g., less than 3 milligrams per 10 kilograms of granular polysilicon, as measured according to the measuring measurement described below. As stated below, crystal pulling operations are not significantly affected by the presence of dust at this low level.

Figure 4:
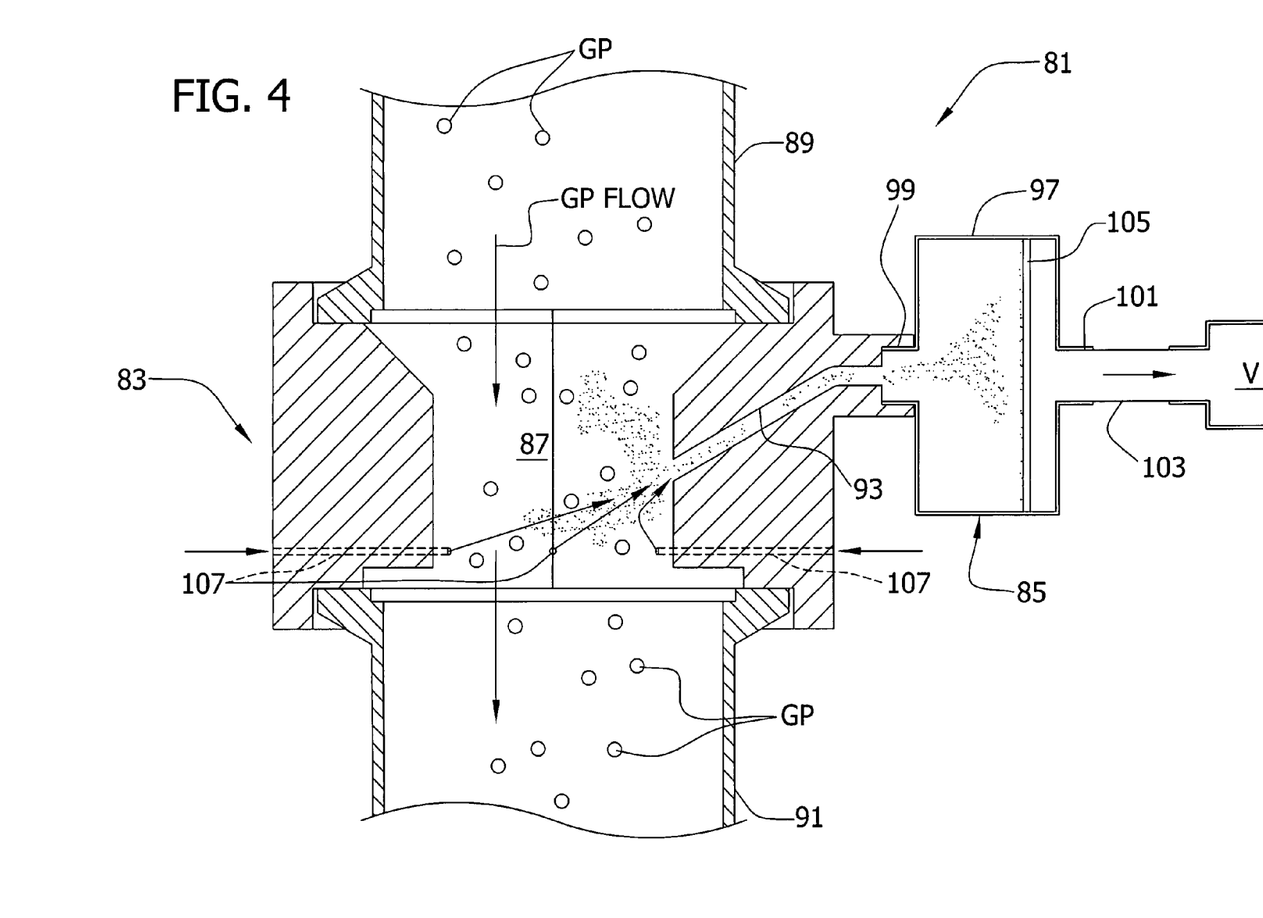
FIG. 4 is a partially schematic cross-section showing a system for measuring dust.

Referring to FIG. 4, a system 81 for measuring dust D in the flow of granular polysilicon GP comprises a manifold, generally designated 83, and a filter assembly, generally designated 85, for capturing the dust. The manifold 83 includes a flow through dust collection chamber 87 for allowing passage of the granular polysilicon flow. The chamber 87 is in fluid communication with an upper vessel 89, such as the source vessel S or process vessel P and discharges the flow into a container 91, such as a feed hopper 117 or other vessel. A dust outlet 93 extends upward through the manifold 83 from the dust collection chamber 87 to a junction with the filter assembly 85. A filter housing 97 of the filter assembly 85 is generally tubular and has a first end 99, received in the outlet 93 of the manifold at the junction and a second end 101 for receiving a hose 103 connected to a vacuum source V. A filter 105 of the filter assembly 85 is retained within the filter housing 97 and thereby disposed between the outlet 93 and the vacuum source V. The filter 105 is circular and is made of a suitable material such as paper. A suitable filter assembly is a 37 mm diameter MILLIPORE® field monitor filter.

The manifold 83 further comprises an air passage including six ports 107 (three are shown in FIG. 4) that extend from the dust collection chamber 87 to the atmosphere surrounding the manifold. The ports 107 are suitably sized, e.g., the ports have an inner diameter between about 0.89 and about 0.11 mm, in one embodiment about 0.10 mm. The ports 107 are equally spaced around the dust collection chamber 87 and are disposed adjacent the outlet 93 (e.g., within about 2.5 cm, or within about 1.25 cm below the outlet) so that the vacuum draws ambient air through the port and through the dust collection chamber opposite the direction of flow of the granular polysilicon GP. The vacuum thereby encourages the dust D to exit the chamber 87 through the outlet 93 and thereafter be trapped in the filter 105.

The dimensions of the outlet 93 of the manifold 83 and the vacuum pump flow rate are selected so as to draw silicon dust particles through the outlet and into the filter 105. The settling rate for silicon dust of less than 10 microns in diameter is about 0.61 cm/s (FIG. 5-80 of Perry's Chemical Engineers' Handbook, Revised $5^{th}$ Ed.). From the settling rate, the outlet diameter is sized between about 0.25 and about 0.36 centimeters, e.g., about 0.30 cm, and the pump flow rate is about 2.50 liters/minute. Note the dust collection chamber 87 is suitably sized about 3.8 cm in diameter.

In a method of measuring the relative amount of dust D in a flow of granular polysilicon GP, the filter assembly 85 is weighed and thereafter connected to the manifold 83 and the vacuum source V in the configuration shown in FIG. 4. Note that either the filter 105 or filter assembly 85 may be weighed. The valve is opened to allow a flow of granular polysilicon GP through the manifold 83 at a predetermined flow rate, and the vacuum source V is turned on to draw dust through the filter 105. The vacuum source V is turned off after a predetermined sampling time (the polysilicon flow may also be turned off). The filter assembly 85 is disconnected from the vacuum source V and the manifold 83, and is weighed a second time. The first weight measurement is subtracted from the second measurement to determine the weight of the dust particles collected in the sampling time. The mass flow rate of the granular polysilicon GP through the manifold 83 is known. The resulting measurement given in terms of dust weight per granular polysilicon weight, e.g., mg of dust per kg of granular polysilicon. The measurement is a relative measure of dust D in the granular polysilicon GP because not all dust is removed from the granular polysilicon in this method. Applicants have found accurate relative measurements of dust are made under the following conditions: sampling time of 1 minute±5 seconds, granular polysilicon flow rate through the dust collection chamber of about 10 kg/minute±0.10, pump flow rate of about 2.50 liters/minute.

The measuring method of this invention can be used at a number of points during manufacture, delivery and use of the granular polysilicon GP. More specifically, the method may be employed at the granular polysilicon point of use, i.e., at the crystal puller, at the point of entry into crystal pulling facility (Incoming Quality Assurance or IQA), or during manufacturing of the granular polysilicon. The method provides a relative dust measurement that can be used to:

(1) assist in quantifying the impact of dust D on crystal yield, (2) accept or reject incoming containers (vessels) of granular polysilicon based on dust therein, (3) sort incoming containers so that only those with dust below a predetermined specification are delivered to crystal pullers used in dust-sensitive crystal growth processes.

As noted above, the prior art has failed to recognize the extent to which the dust D affects the yield of high quality semiconductor crystal, and the extent to which the dust affects advanced crystal growers. When the granular polysilicon GP is transferred from the container to a feeder system of a crystal grower, the dust is also transferred to the feeder system, From the feeder system, the dust D can settle and collect on the surface of the crystal grower hot zone, especially on colder surfaces in advanced "closed" crystal growers. The dust D may then contact the crystal or the silicon melt near the crystal/melt interface. Such contact significantly increases the risk of undesirable defects, such as "Loss of Zero Dislocation" (LZD) in high quality semiconductor crystal. Such crystal, and the advanced grower used to grow the crystal, are found to be "dust sensitive."

Figure 5:
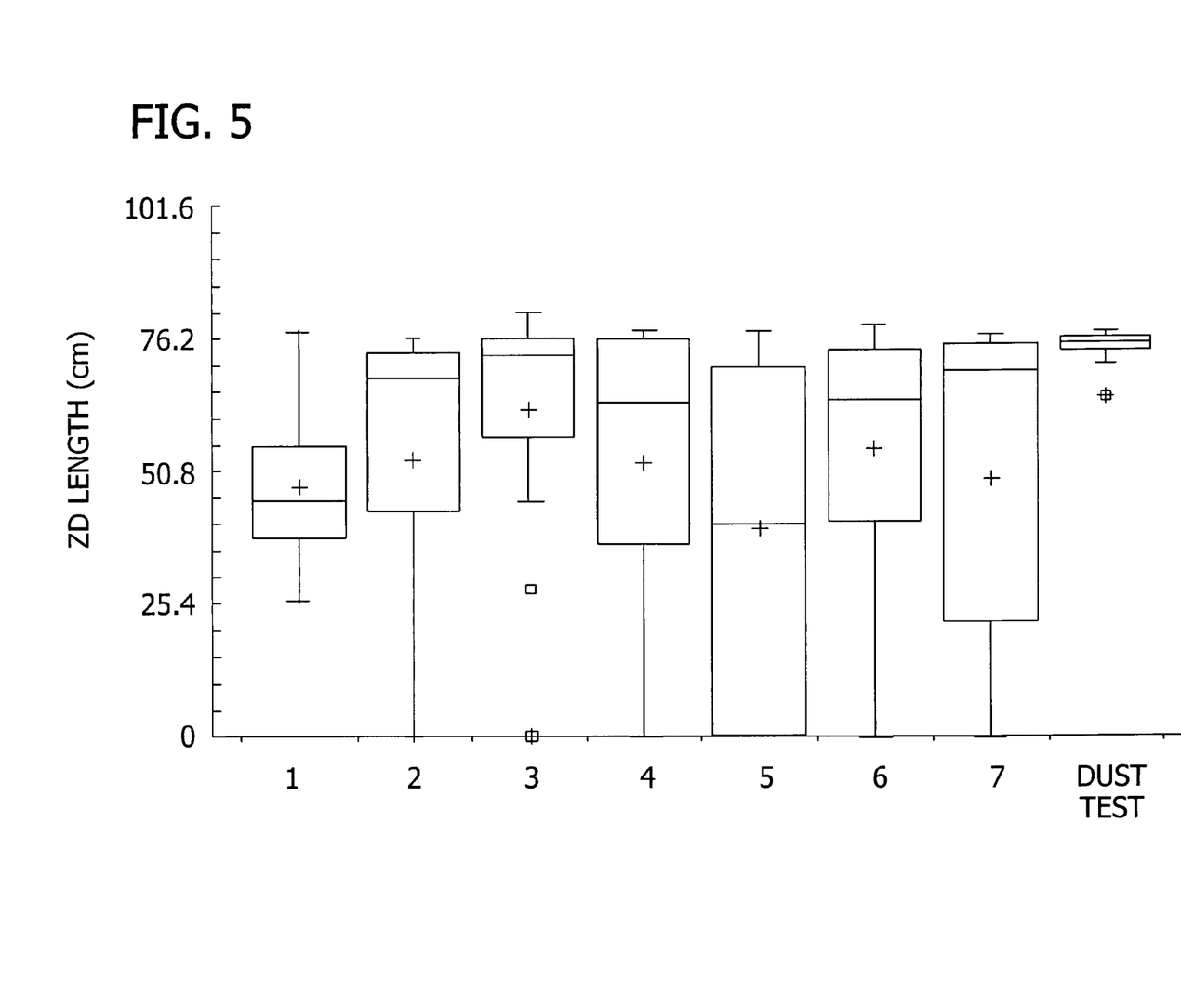
FIG. 5 is a graph of yield of zero dislocation crystal.

Applicants have found that when the dust level in the granular polysilicon used in crystal growing is consistently maintained below the specification of 3 mg per 10 kg of granular polysilicon, an unexpectedly large increase in the yield of "Zero Dislocation" crystal occurs, as shown in FIG. 5. In FIG. 5, the yield is that portion of the length of 300 mm crystal in which there are zero dislocations. FIG. 5 shows that prior to use of the specification (the data in the 7 columns preceding the "Dust Test" column), there was a consistently significant variance in yield. In other words, in samples of about 30 crystals, the length of zero dislocation crystal grown in each crystal varied anywhere from about 0 to about 76.2 cm. For example in sample column 7, the yield varied from 0 to about 76.2 cm for a sample of about 32 crystals. With use of the specification (Dust Test column), the yield ranged from about 71 to about 79 cm for a sample of about 29 crystals. No other variables in crystal growth were varied during the dust test. Accordingly, applicants believe that use of granular polysilicon within the specification caused this surprising increase in yield.

To ensure the quality of granular polysilicon delivered to the crystal pullers, one can employ any one of the measuring and dust removal steps discussed above, or any combination thereof. For example, dust D in the source vessels can be measured and sorted according to the dust measurement. The vessels with the lowest dust may then be used in the most dust-sensitive crystal pulling applications. Alternatively, vessels with dust D exceeding the specification can be "de-dusted" using the above methods. Further, either of the dust removal methods could be performed during manufacturing to ensure that substantially all of the source vessels delivered to the crystal pulling facility are below the dust specification.

The dust removal methods have proven to be more effective than "gas classification," which is typically used in granular polysilicon manufacturing, as described below. Applicants found that gas classification does not filter out a sufficient amount of the dust D. Further, dust is often segregated into one portion of a large hopper used during manufacturing to fill shipping containers (vessels). Such segregation causes some containers to have relatively low levels of dust, while other containers have relatively high levels, depending on whether the hopper was nearly full or nearly empty when the container was filled. During one sample period, about 25% of containers received at a crystal growing facility had dust exceeding the specification discussed above. The new dust removal methods of this invention were found sufficient to ensure that a significantly higher percentage of the granular polysilicon falls within the dust specification. This result is proven by the higher ZD crystal yields shown in FIG. 5.

Figure 6:
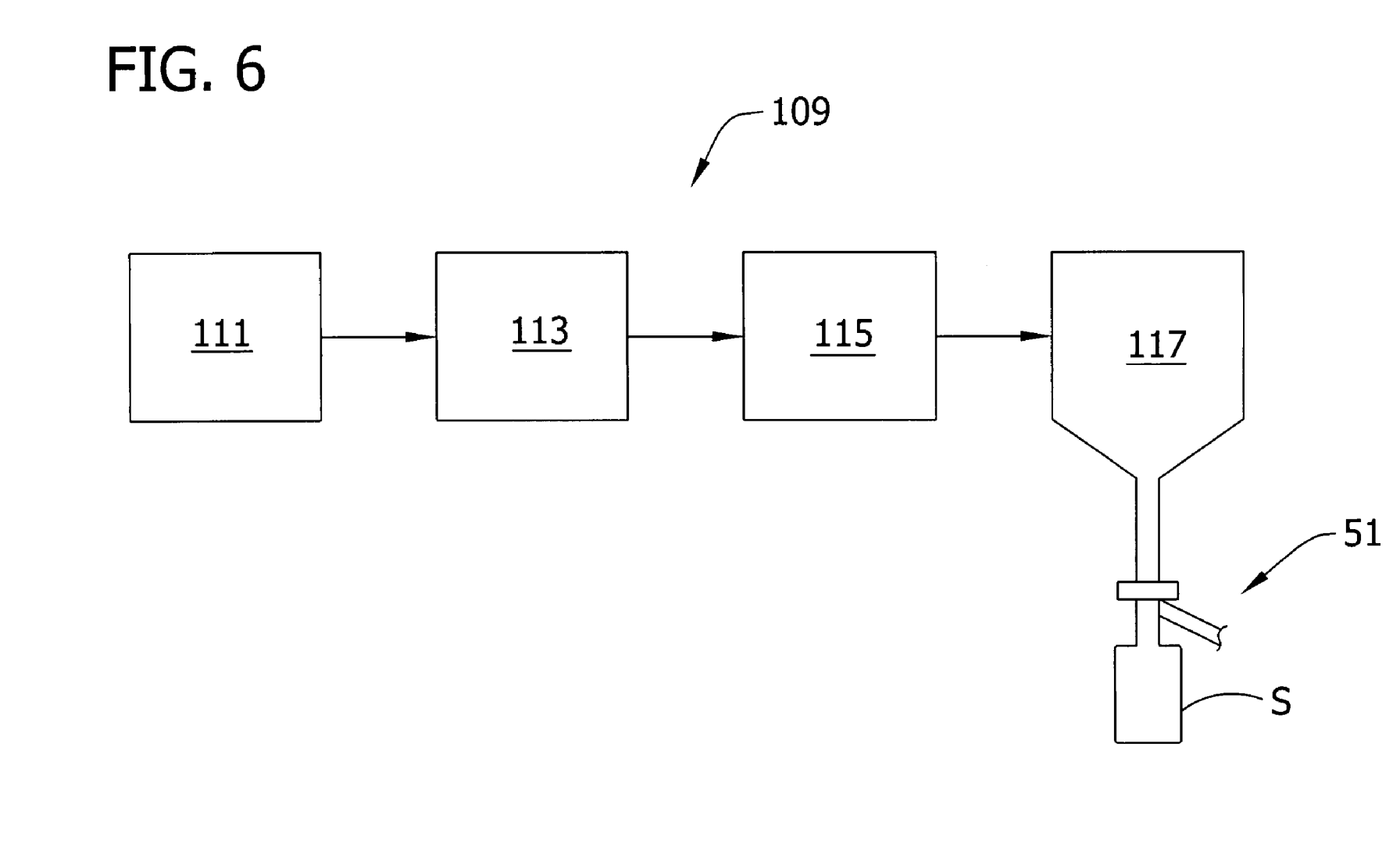
FIG. 6 is a schematic of a granular polysilicon manufacturing and packaging system.

In another method, the granular polysilicon is de-dusted as part of the manufacturing and packaging process. Referring to FIG. 6, a manufacturing and packaging system 109 is shown schematically and comprises a conventional fluidized bed reactor 111, a conventional gas classifier 113, a conventional dehydrogenator 115 and the dust removal system 51. The system 109 is used in a continuous manufacturing method. A first step of the method is a conventional chemical vapor decomposition process wherein polysilicon seeds are periodically fed into the reactor 111. More particularly, the seeds are fed into a flowing gaseous mixture of $SiH_4+H_2$ at a temperature suitable for decomposition of the $SiH_4$ into $H_2$ gas and Si. The Si deposits on the polysilicon seeds to form the granular polysilicon GP, which is thereafter removed from the reactor 111. The granular polysilicon is transferred by suitable means (e.g., a portable hopper) to the gas classifier 113 for classification by particle size. The granular polysilicon is then subjected to dehydrogenation in the dehydrogenator 115. The granular polysilicon may also be subjected to the gas classifier multiple times, before and/or after the dehydrogenation.

During deposition and dehydrogenation, dust D is generated by collisions of the particles with one another and with the internal walls of the respective reactor 111 and dehydrogenator 115. Dust is also generated in the reactor 111 by nucleation and growth of particles during $SiH_4$ decomposition. To remove the dust D, the granular polysilicon is placed in a hopper 117 connected to the dust removal system 51 and dust is removed from the granular polysilicon according to the method described above. The system 51 delivers the de-dusted granular polysilicon into the source vessel S. The method is suitably used to deliver a substantial amount, e.g., at least 3000 kg, of de-dusted granular polysilicon to a plurality of source vessels (shipping containers). The granular polysilicon is thereby packaged in substantially dust-free form and ready for shipment to customers. In this method, de-dusting at the point of use is not needed because each source vessel will have less than the specified amount of dust.

It will be understood that other dust removal systems may be used instead of, or in addition to, the system 51. For example, the system 11 may be used, and the hopper 117 may be modified similar to the process vessel P so that dust D is pulled from around the granular polysilicon. Also, the dust removal systems may be employed between other steps in the manufacturing process, e.g., prior to dehydrogenation.

EXAMPLES

Two 300 kilogram source vessels (or shipping drums) arrived at the crystal growing facility. The vessels were emptied into process vessels in the configuration shown in FIG. 1, with the addition of the dust measurement system of FIG. 4 being installed below the AOR valve. The dust level in each vessel was measured using the above method, and was determined to be 4.9 mg/10 kg in the first vessel and 7.5 mg/10 kg in the second vessel (i.e., out of specification).

The system 11 of FIG. 2 was used to remove dust D from the vessels, and the measurement system of FIG. 4 was again installed below the AOR valve. The vacuum pulling step was performed at a pressure between 1.8 and 2.3 cm of water below atmospheric pressure, which allowed the granular polysilicon to flow at a relatively efficient rate of about 10 kg/minute. The dust in the first vessel was reduced to 0.8 mg/10 kg, and the dust in the second vessel was reduced to 1.0 mg/10 kg. The operations of pouring the granular polysilicon from the source vessel into the process vessel and back again took about two hours.

Figure 7:
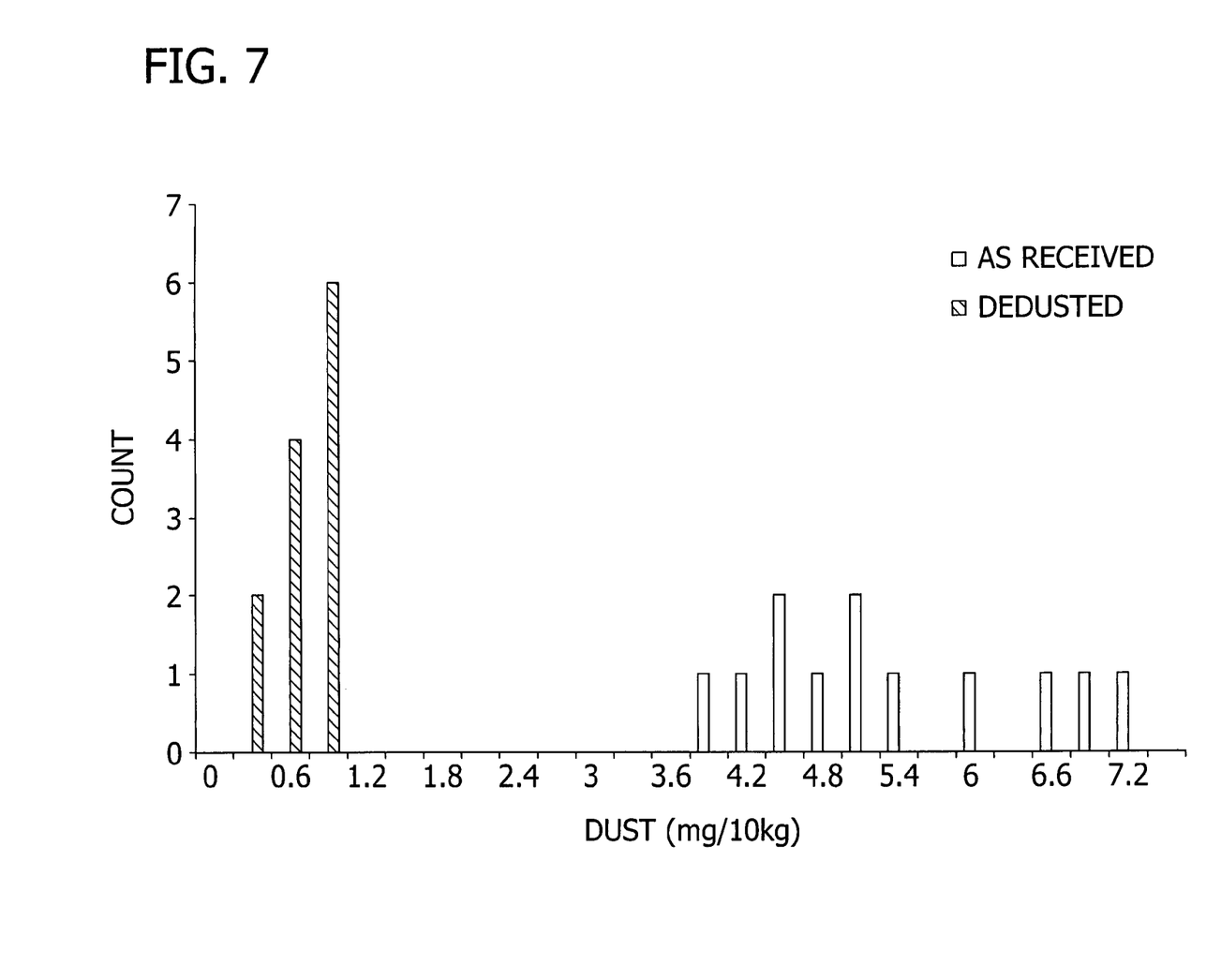
FIGS. 7-8 are graphs of dust contained in a sample of source vessels.
Figure 8:
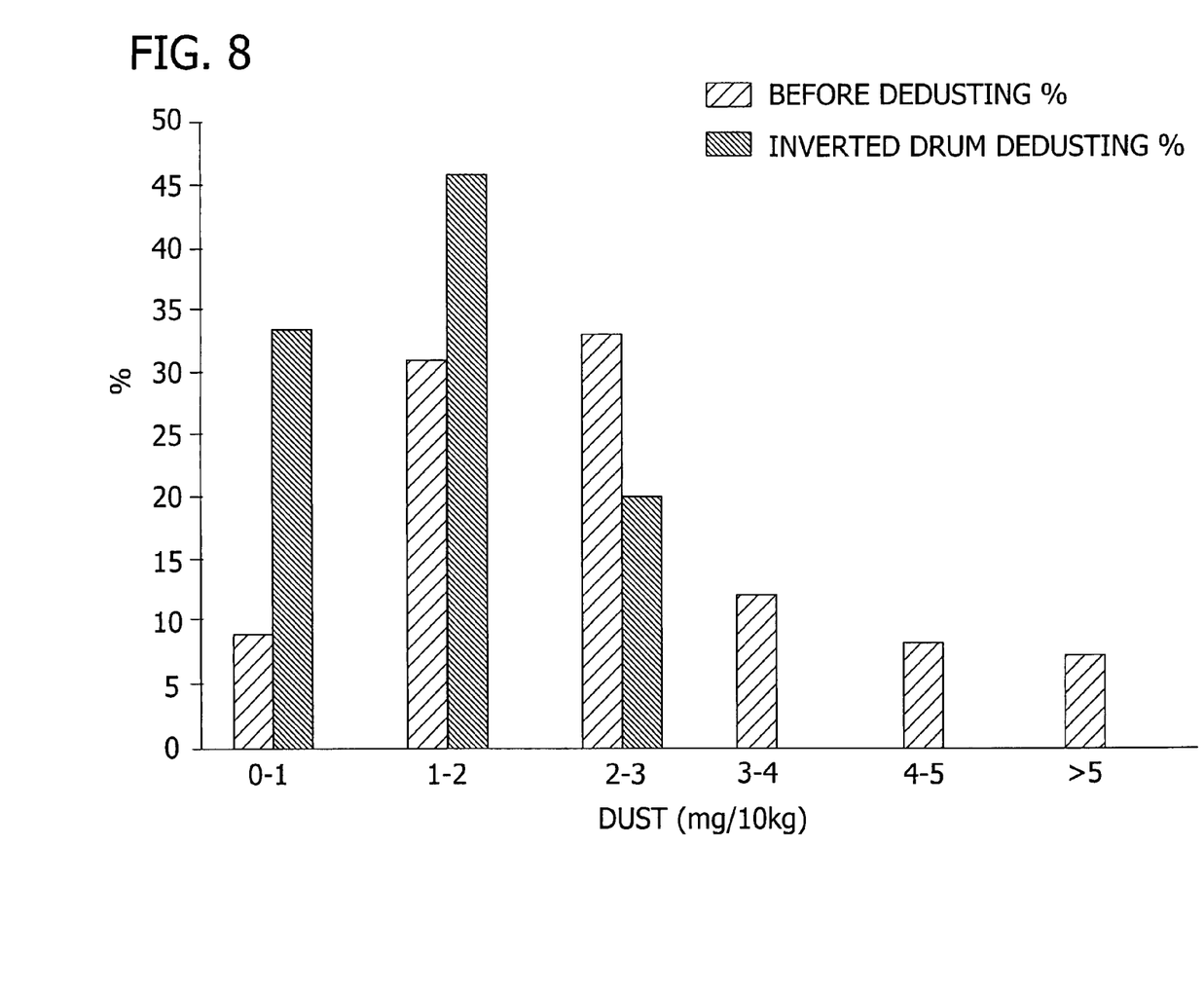

In another example shown in FIG. 7, twelve 300 kilogram source vessels received at the crystal growing facility were "de-dusted" using the "inverted container" system of FIG. 2. As shown in FIG. 7, all of the vessels had dust greater than the 3 mg/10 kg specification, as measured upon delivery to the facility according the method described above. After one de-dusting cycle, the dust in each of the vessels was less than the specification. In another example shown in FIG. 8, several 300 kilogram source vessels received at the crystal growing facility were "de-dusted" using the "inverted container" system of FIG. 2. As shown in FIG. 8, about 27% of the vessels had dust greater than the 3 mg/10 kg specification upon delivery to the facility, as measured according the method described above. After one de-dusting cycle, the dust in each of the vessels was less than the specification.

To avoid contamination of the granular polysilicon GP handled by the systems 11 and 51, all system components in contact with granular polysilicon at a high velocity are formed or coated with materials selected to maintain the non-contaminating performance of the system. Such materials include, but are not limited to, quartz coatings, silicon coatings, solid silicon and solid silicon carbide. Typically, the coatings are applied to a stainless steel substrate. Other materials suitable for non-contaminating performance are also contemplated as within the scope of the present invention. For low velocity portions of the apparatus, TEFLON® or TEFZEL® coatings (available from E. I. du Pont de Nemours and Company of Wilmington, Delaware, U.S.A.) provide acceptable non-contaminating performance. Also, upon delivery at the crystal growing facility, the source vessel contains non-contaminating argon to maintain the purity of the granular polysilicon, but the argon is typically not necessarily held therein in a humidity-controlled environment, such as a crystal growing facility.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A system for removing dust from granular polysilicon comprising:
   a vacuum source for pulling dust away from the granular polysilicon;
   a process vessel adapted to receive the granular polysilicon
   the process vessel including:
   opposite first and second ends,
   a polysilicon passage in the first end for allowing passage of the granular polysilicon and
   a vacuum port for connection to the vacuum source;
   the vacuum port disposed adjacent the second end of the process vessel so that the granular polysilicon does not block the port when the process vessel is rotated from the upright position for pouring of the granular polysilicon from the process vessel; and
   a container for receiving the granular polysilicon from the process vessel.

2. The system as set forth in claim 1 wherein the vacuum port is disposed in a side wall of the process vessel.

3. The system as set forth in claim 1 in combination with the granular polysilicon, wherein there is less than 3 mg of dust per 10 kg of the granular polysilicon received in the container.

4. The system as set forth in claim 1 further comprising a valve connected to the polysilicon passage for selectively stopping flow of the granular polysilicon through the polysilicon passage.

5. The system as set forth in claim 4 wherein the valve is an angle of repose valve.

6. A process vessel adapted to receive granular polysilicon comprising:
   opposite first and second ends,
   a polysilicon passage in the first end for allowing passage of the granular polysilicon; and
   a vacuum port for connection to a vacuum source;
   a closure for the vacuum port;
   the vacuum port being disposed adjacent the second end of the process vessel so that the granular polysilicon does not block the port when the process vessel is rotated from the upright position for pouring of the granular polysilicon from the process vessel.

7. The system as set forth in claim 6 wherein the vacuum port is disposed in a side wall of the process vessel.

8. The system as set forth in claim 6 in combination with the granular polysilicon, wherein there is less than 3 mg of dust per 10 kg of the granular polysilicon received in the container.

9. The system as set forth in claim 6 further comprising a valve connected to the polysilicon passage for selectively stopping flow of the granular polysilicon through the polysilicon passage.

10. A method of removing dust from a quantity of polysilicon material comprising granular polysilicon and dust stored in a process vessel having a polysilicon passage in one end for discharging the granular polysilicon and a vacuum port in or adjacent an opposite end and spaced from the granular polysilicon, the method comprising:
    pouring the quantity of polysilicon material from the process vessel into a container;
    pulling a vacuum through the vacuum port to pull the dust from around the granular polysilicon and to inhibit pulling of the granular polysilicon.

11. The method as set forth in claim 10 wherein the pouring and pulling steps are performed repeatedly until there is less than 3 mg of dust per 10 kg of granular polysilicon received in the container.

12. The method as set forth in claim 10 wherein the vacuum pulling step is performed at a pressure between 1.3 and 5.1 centimeters of water below atmospheric pressure.

13. The method as set forth in claim 10 wherein the vacuum pulling step is performed at a pressure between 1.8 and 2.3 centimeters of water below atmospheric pressure and the polysilicon is poured at a flow rate between 10-12 kilograms per minute.

14. A system for removing dust from a flow of granular polysilicon comprising:
    a baffle tube having an upper opening adapted for fluid communication with a granular polysilicon supply for receiving the flow of granular polysilicon, and a lower opening for discharging the granular polysilicon;
    at least one baffle below the upper opening to alter the direction of flow of the granular polysilicon to encourage dust entrained in the granular polysilicon to separate from the granular polysilicon; and
    a vacuum source connected to the upper opening to pull gas-entrained dust opposite a direction of the flow of the granular polysilicon through the baffle tube.

15. The system as set forth in claim 14 further comprising a housing mounting the baffle tube.

16. The system as set forth in claim 15 wherein the housing mounts a funnel disposed above the baffle tube for shielding the flow of polysilicon from the vacuum.

17. The system as set forth in claim 15 wherein the housing includes a vacuum port disposed above the upper opening of the baffle tube to inhibit pulling of the polysilicon through the vacuum port.

18. A system for measuring dust in a flow of granular polysilicon comprising:
    a vacuum source;
    a filter to capture dust for use in measuring the dust;
    a manifold including:
    a dust collection chamber for allowing passage of the granular polysilicon;
    an outlet extending from the chamber and in fluid communication with the vacuum source for pulling dust from the chamber; and
    an air passage including at least one port extending from the chamber to an atmosphere surrounding the system, wherein the filter is disposed between the outlet and the vacuum source;

the one port of the air passage being disposed adjacent the outlet for drawing ambient air through the chamber opposite the direction of flow of the granular polysilicon and thereby encouraging the dust to exit the chamber through the outlet and thereafter be trapped in the filter.

19. The system as set forth in claim 18 wherein the air passage includes six equally spaced ports within about 2.5 cm of the outlet.

20. The system as set forth in claim 19 wherein the air passage is disposed below the outlet.

21. The system as set forth in claim 18 wherein the filter is made of paper.

22. The system as set forth in claim 18 wherein the outlet is sized between about 0.25 and about 0.36 centimeters.

23. A method of measuring dust from a flow of polysilicon material including granular polysilicon and dust using an apparatus comprising a vacuum source, a manifold including a dust collection chamber for the flow of polysilicon material, an outlet extending from the dust collection chamber and in fluid communication with the vacuum source, a filter disposed between the outlet and the vacuum source, an air passage extending from the chamber to an atmosphere surrounding the system, the air passage including a port disposed adjacent the outlet, the method comprising the steps, in order, of:

weighing the filter a first time;

operating the vacuum source for a predetermined period of time as the stream of polysilicon material flows through the chamber at a predetermined mass flow rate, the vacuum source operating to draw air and dust through the outlet and to the filter where the dust is captured and air passes through to the vacuum source;

stopping operation of the vacuum source; and weighing the filter a second time after operation of the vacuum source to determine the weight of the dust captured by the filter.

24. The method set forth in claim 23 wherein the vacuum source is operated at a predetermined flow rate to draw dust of 10 microns or less.

25. The method set forth in claim 23 wherein the predetermined period of time is more than about 30 seconds and less than about 90 seconds.

26. The method set forth in claim 23 wherein the predetermined polysilicon flow rate is about 10-12 kg/minute and the air is drawn into the air passage at a rate of about 2.5 liters/minute.

27. A supply of granular polysilicon produced in a continuous manufacturing method and suitable for making semiconductor grade crystal, the granular polysilicon having an average diameter or average width sized between 400 and 1400 microns, wherein the supply of granular polysilicon weighs at least about 3000 kg, and wherein particles of dust entrained in the polysilicon are sized less than 10 microns and have a mass less than 3 mg of dust per 100 kg of polysilicon.

28. A supply as set forth in claim 27 wherein the supply is contained in a plurality of containers.

29. A method of manufacturing granular polysilicon comprising:

forming the granular polysilicon by chemical vapor deposition in a fluidized bed process;

classifying the granular polysilicon by size;

removing dust from the granular polysilicon so that dust within the granular polysilicon has a mass less than 3 mg per 100 kg of polysilicon; and packaging the granular polysilicon after the dust has been removed.

30. A method as set forth in claim 29 wherein the dust removal step includes delivering polysilicon material including granular polysilicon and dust to a baffle tube.

31. A method as set forth in claim 30 wherein the dust removal step includes pulling a vacuum on the baffle tube to pull dust from the polysilicon material.

32. A method as set forth in claim 30 further comprising the step of transferring the polysilicon material to a hopper prior to removing the dust, and wherein the dust removal step includes pulling a vacuum on the polysilicon material in the hopper to remove the dust therefrom.

33. A method as set forth in claim 32 further comprising the step of dehydrogenating the granular polysilicon material.

* * * * *